United States Patent [19]

Stader

[11] Patent Number: 4,701,947
[45] Date of Patent: Oct. 20, 1987

[54] CIRCUIT ARRANGEMENT FOR SUPPRESSING INTERFERENCE SIGNALS ON THE RECEIVING ARM OF A TELEPHONE SUBSCRIBER LINE CIRCUIT

[75] Inventor: Harald Stader, Munich, Fed. Rep. of Germany

[73] Assignee: Siemens Aktiengesellschaft, Berlin and Munich, Fed. Rep. of Germany

[21] Appl. No.: 873,010

[22] Filed: Jun. 11, 1986

[30] Foreign Application Priority Data

Jul. 24, 1985 [DE] Fed. Rep. of Germany ....... 3526529

[51] Int. Cl.⁴ .......................... H04Q 11/04; H04Q 3/24
[52] U.S. Cl. ..................................... 379/124; 379/405
[58] Field of Search ............... 379/124, 125, 399, 405, 379/416; 375/58; 333/175, 176

[56] References Cited

U.S. PATENT DOCUMENTS 3,097,266  7/1963  Lüscher ............................. 379/124
3,941,935  3/1976  Vicentini et al. ............... 379/124 X Primary Examiner—Gene Z. Rubinson
Assistant Examiner—Mark E. Ham
Attorney, Agent, or Firm—Thomas H. Jackson

[57] ABSTRACT

A circuit arrangement for suppressing interference signals on the receiving arm of a subscriber line circuit is constructed from electronic components and thus comprises no speech transformers. The receiving arm of the subscriber line circuit (SLIC) is connected to a two-pole filter circuit (ZF) which consists of the parallel arrangement of a parallel—and a series—resonance circuit (LP,CP and LS,CS), the resonance frequency of which corresponds to the frequency of the signals which are fed-in for the transmission of charge pulses and which charge pulses can manifest themselves as interference signals when reflected without the provision of the described measures.

2 Claims, 4 Drawing Figures

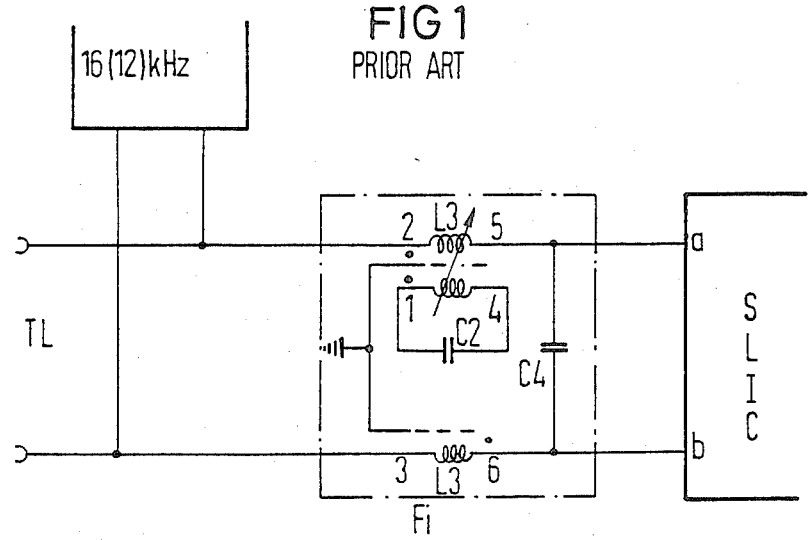
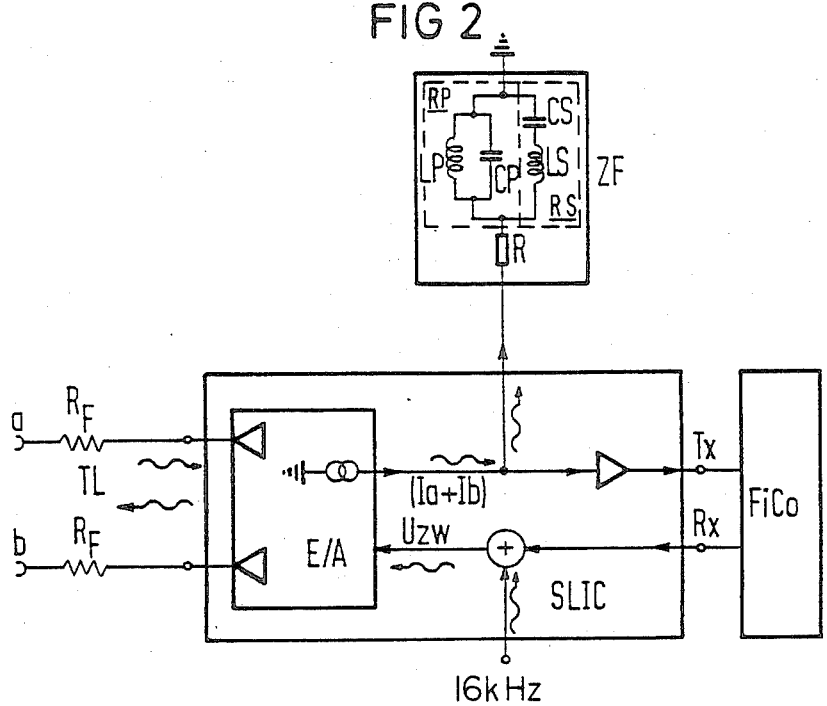

CIRCUIT ARRANGEMENT FOR SUPPRESSING INTERFERENCE SIGNALS ON THE RECEIVING ARM OF A TELEPHONE SUBSCRIBER LINE CIRCUIT

BACKGROUND OF THE INVENTION

1. Technical Field

The invention relates to the field of interference suppression in telephone networks and, more particularly, to a circuit arrangement for suppressing interference signals on the receiving arm of a subscriber line circuit which is constructed from electronic components and thus avoids the use of speech transformers. More particularly, it relates to connecting a two-wire subscriber line circuit to the exchange of a digital time division multiplex telephone system, where interference signals occur on subscriber lines as a result of change pulse signals intentionally fed-in to the transmitting path and which are intended for the subscriber station connected to the exchange via the subscriber lines.

2. Description of the Prior Art

The transmission of charge pulses to subscriber stations which are connected via two-wire subscriber lines to an exchange for the purpose of charge metering at the subscriber station is carried out by transmitting alternating voltage pulses at frequencies which are outside the speech band and which amount, for example, to 12 kHz or 16 kHz.

Without the provision of special measures, these pulses can return from the subscriber station to the receiving arm of the subscriber line circuit and from there to the analog to digital conversion devices. At the large amplitude necessary for charge metering, this kind of undesired influence on these A/D converter devices can considerably impair their proper functioning.

In conventional exchange systems in which a.c. pulses (16 and 12 kHz) are fed-in symmetrically and in which a speech transformer is provided for the output coupling of the speech signals to be supplied to the coding device, interference signals are suppressed in a known manner by means of a filter Fi, representing a four-pole circuit, in the form of a parallel resonator. However, the outlay and set requirements for such a filter are considerable, and, in addition, the line symmetry of the subscriber line is disturbed resulting in the known outcome of sensitivity to series voltages and a noisy line.

SUMMARY OF THE INVENTION

The object of the present invention is to provide a subscriber line circuit which is constructed from electronic components and thus avoids the use of speech transformers but in which the charge pulse signals are fed into the transmitting arm of the subscriber line circuit to provide a circuit arrangement which serves to suppress the interference signals which occur accordingly on the receiving arm but which avoids the problems inherent in using the aforementioned known filter circuits.

In accordance with the invention these objects are fulfilled in a circuit arrangement of the type described which is characterised in that the receiving arm of the subscriber line circuit is connected to a two-pole filter circuit which consists of a parallel arrangement of a series resonance circuit and a parallel resonance circuit, the resonance frequency of which in each case corresponds to the frequency of signals fed in for purposes of charge pulse transmission.

The circuit arrangement in accordance with the invention not only has a small space requirement but in particular, in accordance with a further development of the invention, the coils of the resonance circuits consist of gyrator circuits, and also necessitate only one connection pin for plug-in connection to the subscriber line circuit, which normally consists of an integrated circuit and which simple connection represents a very desirable effect. To these advantages can be added the fact that, on the one hand, there is virtually no influence on the frequency response in the speech frequency band and the insertion attenuation is low, and, on the other hand, there is a very strong damping in the region of the 16 kHz-pulse signals.

In the following detailed description, the invention will be explained in detail in the form of exemplary embodiments making reference to the drawings.

BRIEF DESCRIPTION OF THE DRAWINGS

FIG. 1 represents the above described, known method of interference signal suppression using a four pole filter Fi;

FIG. 2 is a fundamental circuit diagram of the circuit arrangement in accordance with the invention;

DETAILED DESCRIPTION OF THE DRAWINGS

Figure 3:
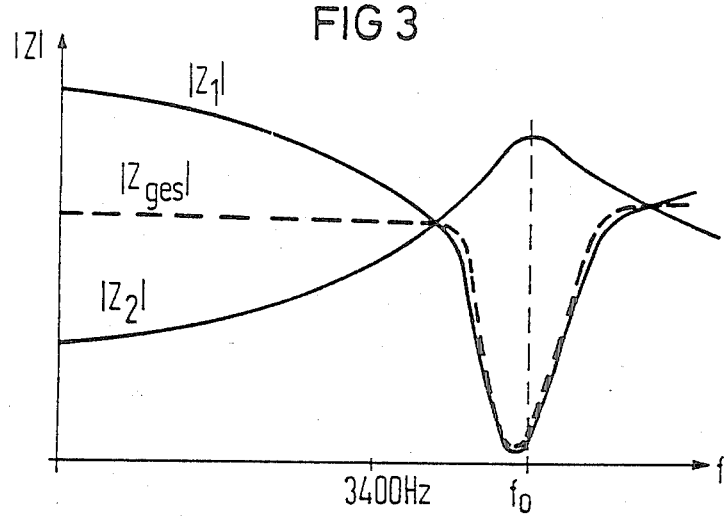
FIG. 3 represents the characteristic curve of the circuit arrangement in accordance with the invention.

The block circuit diagram of an electronic subscriber line circuit as shown in FIG. 2 comprises, as fundamental components, a circuit assembly SLIC and an assembly FiCo.

The assembly SLIC to which the subscriber line circuit TL is connected by the wires a and b, usually comprises (not shown in detail) circuit components for the subscriber feed, for surge voltage protection, for feeding in the ringing signal, for signalling and monitoring, for two-wire/four-wire conversion and for testing.

The circuit component FiCo comprises the circuit components for filtering and for analog-to-digital conversion and digital-to-analog conversion. It should be considered to be connected to the switching network of the exchange to which this subscriber line circuit is assigned. It is also possible that the aforementioned circuit elements for two-wire to four-wire conversion form part of the assembly FiCo.

FIG. 2 also shows that on the transmitting arm of the subscriber line circuit; thus that arm which leads via the corresponding part of an input/output stage E/A to the b-wire of the subscriber line, an alternating current signal is fed-in which serves to carry out charge metering at the subscriber station and which is to have a frequency, for example, of 16 kHz.

As also shown in the figure, parts of these a.c. signals, having been reflected on the subscriber station which is to be imagined to be connected to the subscriber line, can pass via the a-wire to the receiving arm of the subscriber line and from here can reach the assembly FiCo where they can undesirably influence speech signals, unless the measures in accordance with the invention are adopted.

These measures consist in the connection of a two-pole filter circuit ZF between the receiving arm of the subscriber line circuit and a circuit point which carries earth potential, where the two-pole filter circuit ZF consists, as shown in the drawing, of the parallel arrangement of a parallel resonance circuit RP and a series resonance circuit RS. In this representation, the resonance circuits each consist of a coil L and a capacitor C although, as indicated, the coil of these resonance circuits can also be simulated by a gyrator circuit.

The two resonance circuits have the same resonance frequency so that a frequency characteristic as represented in FIG. 3 occurs.

Then, as a result of the opposing impedance characteristics of the parallel resonance circuit and the series resonance circuit, the net impedance characteristic which is governed by the filter circuit and which itself governs the insertion attenuation is virtually independent of frequency and falls abruptly towards the resonance frequency which corresponds to the frequency of the a.c. signals which are fed-in in association with the charge metering. The interference signals which occur on the receiving arm of the subscriber line circuit are therefore decoupled to earth and cannot reach the assembly FiCo.

As explained, the filter circuit in accordance with the invention is a two-pole circuit so that only one connection pin need be provided for connection to the circuit assembly SLIC.

Figure 4:
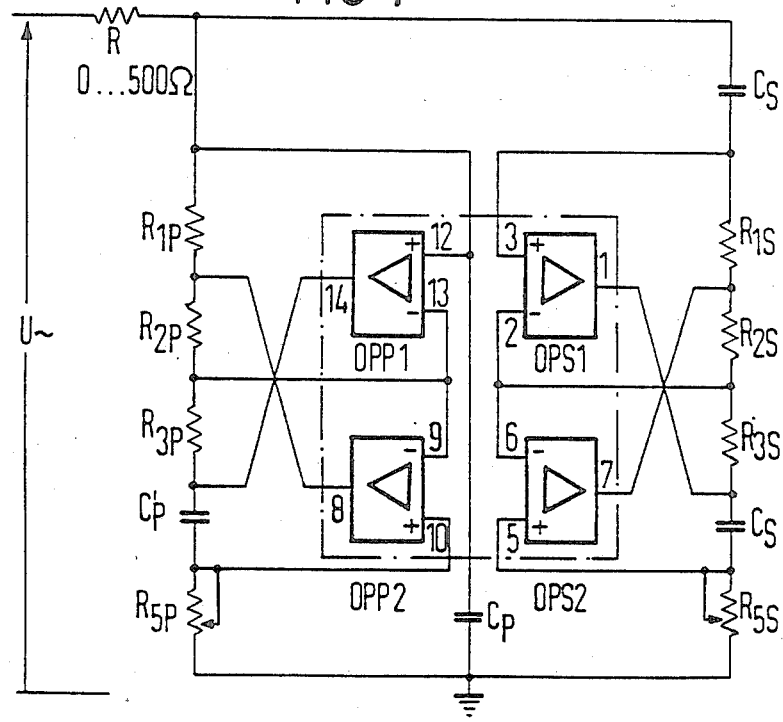
FIG. 4 represents an exemplary embodiment of the filter circuit used in accordance with the invention, in which the oscillating circuit coils are replaced by gyrator circuits.

In the embodiment represented in FIG. 4 of a two-pole filter provided in accordance with the invention, the inductances of the resonance circuits consist of gyrator circuits which each consist of two operational amplifiers, a series of resistors and a capacitor. The gyrator circuit shown in FIG. 4, which forms part of the parallel oscillating circuit, comprises the series arrangement of the resistors R1p to R3p, the capacitor C'P and the adjustable resistor R5p which is located between the one pole of the filter circuit connected to earth potential and the one terminal of a resistor R which leads to the second pole of the filter circuit. The non-inverting inputs of the operational amplifiers OPP1 and OPP2 are connected to the resistor R and to the connection point of the capacitor C'p and R5p respectively. The inverting inputs of the operational amplifiers are connected to one another and are connected to the connection point of the resistors R2p and R3p. The output of the operational amplifier OPP1 is connected to the connection point of the resistor R3p and the capacitor C'p, whereas the output of the operational amplifier OPP2 is connected to the connection point of the resistors R1p and R2p. The circuit arrangement which has been thus far represented operates electrically in the manner of a coil and is supplemented to form a parallel resonance circuit by the capacitor Cp which is connected to the non-inverting input of the operational amplifier OPP1 and, on the other hand, is connected to earth potential.

Similarly the inductance of the series resonance circuit is formed by the resistors R1s to R3s, the capacitor C's, the resistor R5s and the operational amplifiers OPS1 and OPS2. The capacitor Cs supplements the circuit arrangement to form a series resonance circuit which is connected between the circuit point which carries earth potential and the first terminal of the resistor R and is thus connected in parallel with the above-described parallel resonance circuit.

By an appropriate adjustment of the aforementioned, adjustable resistors R3p and R5s, the two resonance circuits are each set at the resonance frequency, for example, 16 kHz or 12 kHz. Typical values for the resistors R1p to R3p and R1s and R3s are 5.6 kOhm, and the capacitance values of the capacitors C'p and C's amount to 32 pF. The capacitance values of the capacitors Cs and Cp amount to 0.1 F. Thus one may construct a circuit in accordance with the invention only limited by the claims which follow.

What is claimed is:

1. A circuit arrangement for suppressing interference signals on the receiving arm of a subscriber line circuit, constructed from electronic components and thus without the use of speech transformers, the subscriber line circuit for connecting a two-wire subscriber line to the exchange of a digital time division multiplex telephone system, which interference signals occur as a result of charge pulse signals which are fed-in to the transmitting arm and which are intended for the subscriber station connected to the subscriber line circuit via the two-wire subscriber line, characterized in that the receiving arm of the subscriber line circuit (SLIC) is connected to a two-pole filter circuit (ZF) which consists of the parallel arrangement of a series resonance circuit (LS,CS) and a parallel resonance circuit (LP,CP) whose resonance frequency in each case corresponds to a frequency fed-in for the transmission of the charge pulse signals.

2. A circuit arrangement as claimed in claim 1, characterised in that the resonance circuits are each constructed from a gyrator circuit (R1p to R3p, C'p, R5p, OPP1, OPP2; R1s to R3s, C's, R5s, OPs1, OPs2).

* * * * *